US008549364B2

(12) United States Patent
Ziskind et al.

(10) Patent No.: US 8,549,364 B2
(45) Date of Patent: Oct. 1, 2013

(54) FAILURE DETECTION AND RECOVERY OF HOST COMPUTERS IN A CLUSTER

(75) Inventors: Elisha Ziskind, Palo Alto, CA (US);
Marc Sevigny, Harvard, MA (US);
Sridhar Rajagopal, Sunnyvale, CA (US); Rostislav Vavrick, Stoneham, MA (US); Ronald Passerini, Somerville, MA (US)

(73) Assignee: VMware, Inc., Palo Alto, CA (US)

( * ) Notice: Subject to any disclaimer, the term of this patent is extended or adjusted under 35 U.S.C. 154(b) by 440 days.

(21) Appl. No.: 12/388,334

(22) Filed: Feb. 18, 2009

(65) Prior Publication Data

US 2010/0211829 A1    Aug. 19, 2010

(51) Int. Cl.
*G06F 11/00* (2006.01)

(52) U.S. Cl.
USPC ............... 714/48; 714/3; 714/15; 709/203; 709/219; 709/223

(58) Field of Classification Search
USPC ............... 714/3, 4, 48; 709/203, 219, 223
See application file for complete search history.

(56) References Cited

U.S. PATENT DOCUMENTS

| 6,125,387 | A  | * | 9/2000  | Simonoff et al. ............. 709/218 |
|-----------|----|---|---------|--------------------------------------|
| 6,199,179 | B1 | * | 3/2001  | Kauffman et al. ............ 714/26   |
| 6,370,656 | B1 | * | 4/2002  | Olarig et al. ................ 714/23 |
| 6,393,476 | B1 | * | 5/2002  | Barnhouse et al. ........... 709/223  |
| 6,748,550 | B2 | * | 6/2004  | McBrearty et al. ............ 714/4   |
| 6,983,317 | B1 | * | 1/2006  | Bishop et al. ................ 709/223 |
| 7,685,358 | B1 | * | 3/2010  | Larson et al. ................ 711/111 |
| 7,849,098 | B1 | * | 12/2010 | Scales et al. ................ 707/781 |
| 7,886,182 | B1 | * | 2/2011  | Coatney et al. ................ 714/3  |
| 2001/0014913 | A1 | * | 8/2001  | Barnhouse et al. ........... 709/223 |
| 2002/0095489 | A1 | * | 7/2002  | Yamagami .................... 709/224 |
| 2003/0051187 | A1 | * | 3/2003  | Mashayekhi et al. ............ 714/4 |
| 2003/0065841 | A1 | * | 4/2003  | Pecone ......................... 710/105 |
| 2004/0268062 | A1 | * | 12/2004 | Ofer ............................. 711/152 |
| 2005/0044301 | A1 | * | 2/2005  | Vasilevsky et al. ............ 711/1 |
| 2005/0108187 | A1 | * | 5/2005  | Fujibayashi .................. 707/1 |
| 2005/0204183 | A1 | * | 9/2005  | Saika .............................. 714/4 |
| 2005/0268156 | A1 | * | 12/2005 | Mashayekhi et al. ............ 714/4 |
| 2006/0080569 | A1 | * | 4/2006  | Sciacca ......................... 714/4 |
| 2006/0190760 | A1 | * | 8/2006  | Saika .............................. 714/4 |
| 2008/0134178 | A1 | * | 6/2008  | Fitzgerald et al. ............. 718/1 |
| 2008/0162983 | A1 | * | 7/2008  | Baba et al. ..................... 714/3 |

* cited by examiner

*Primary Examiner* — Joshua P Lottich
*Assistant Examiner* — Jeison C Arcos

(57) ABSTRACT

In one or more embodiments of the invention, communication among host agents providing high availability in a computer cluster is implemented by reading and writing to files on a shared data store. Each host agent holds a lock on a file on the shared data store corresponding to a liveness indicator for the host agent and a coordinator host agent periodically monitors the liveness indicators for host failures.

18 Claims, 6 Drawing Sheets

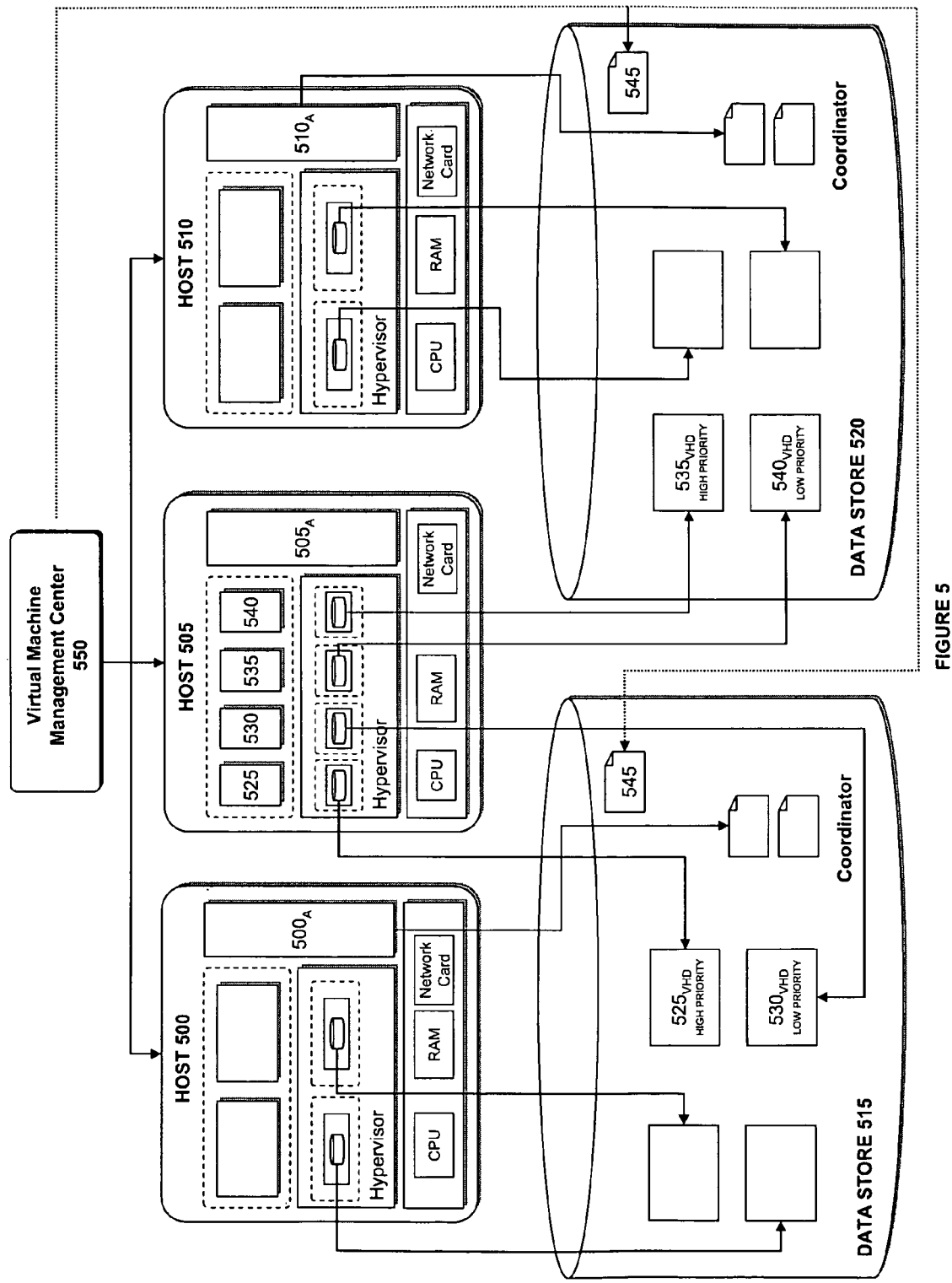

FAILURE DETECTION AND RECOVERY OF HOST COMPUTERS IN A CLUSTER

BACKGROUND OF THE INVENTION

A computer "cluster" typically refers to a group of linked computers (also referred to herein as "hosts") that are deployed in an aggregate, and a so-called "high availability" cluster is one in which redundant computing resources are provided in case of hardware failure.

In a virtual machine environment, each host in a cluster can support multiple virtual machines. In a high availability cluster in such a virtual machine environment, when a host fails, each of the virtual machines running on the host is re-instantiated on another host in the cluster that has sufficient resources to support such virtual machine (such re-instantiation being referred to as "failover"). Current methods of detecting host failure and performing "failover" depend upon a software agent running on each host in the cluster. These agents communicate with each other through a common network (typically, a private network that differs from a network utilized by the virtual machines to provide services) to coordinate activity, such communication including selecting one or more "primary" agents having the responsibility of: (a) synchronizing cluster state and configuration information across the cluster, (b) monitoring the condition of hosts in the cluster (e.g., by receiving TCP messages from the hosts that indicate "liveness"), and (c) directing the initiation of failover upon detecting a failure.

SUMMARY OF THE INVENTION

In a computer system having virtual machines instantiated on a cluster of host computers networked to a shared storage system, a method of monitoring failures in the host computers according to an embodiment of the present invention includes the steps of periodically examining, for each host computer in the cluster, a liveness indicator associated with a file in the shared storage system corresponding to the host computer, and identifying one or more host computers whose liveness indicator has not been updated within a predetermined time interval as a failed host computer.

In one embodiment, the liveness indicator is a heartbeat entry of the corresponding host computer and a lock associated with the file includes a reference to the heartbeat entry. In such an embodiment, the corresponding host computer maintains possession of the lock and the examining step involves inspecting the lock associated with the file.

In yet another embodiment, one of the host computers in the cluster serves as a coordinator that performs the foregoing method while each of the other host computers in the cluster periodically examine a liveness indicator associated with a coordinator file in the shared storage system to assess a liveness of the coordinator and assume responsibilities of the coordinator if the liveness indicator associated with the coordinator file has not been updated within a predetermined time period.

BRIEF DESCRIPTION OF THE DRAWINGS

FIG. 5 depicts an example cluster configuration using different data stores in accordance with one or more embodiments of the present invention.

DETAILED DESCRIPTION

Figure 1:
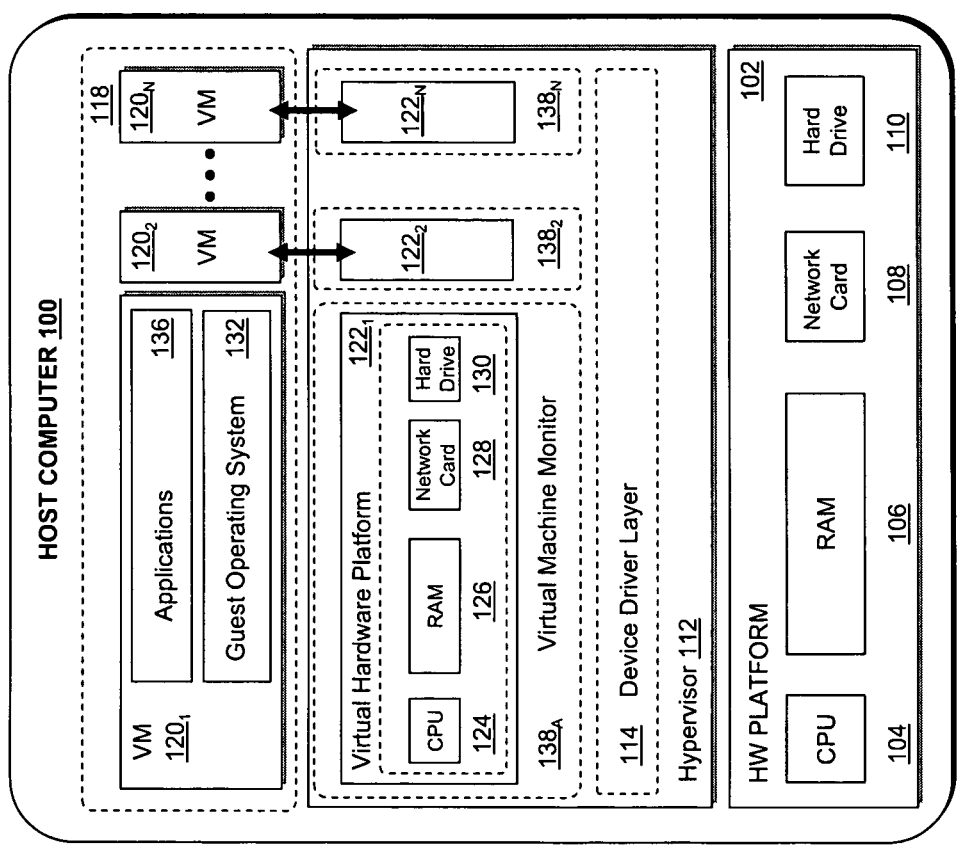
FIG. 1 depicts a block diagram of a host computer in which one or more embodiments of the invention may be practiced.

FIG. 1 depicts a block diagram of host computer 100 in which one or more embodiments of the invention may be practiced. Host computer 100 may be constructed on a desktop, laptop or server grade hardware platform 102 such as an x86 architecture platform. Such a hardware platform may include CPU 104, RAM 106, network card 108 (NIC 108), hard drive 110 and other I/O devices such as a mouse and keyboard (not shown in FIG. 1). A virtualization software layer, also referred hereinafter as hypervisor 112, is installed on top of hardware platform 102. The virtualization software layer supports virtual machine execution space 118 within which multiple virtual machines (VMs $120_1$-$120_N$) may be concurrently instantiated and executed. Hypervisor 112 includes device driver layer 114 and maps physical resources of hardware platform 102 (e.g., CPU 104, RAM 106, network card 108, hard drive 110, a mouse, a keyboard, etc.) to "virtual" resources of each of VMs $120_1$-$120_N$ such that each of VMs $120_1$-$120_N$ has its own virtual hardware platform (i.e., a corresponding one of virtual hardware platforms $122_1$-$122_N$), each virtual hardware platform having its own emulated hardware (such as CPU 124, RAM 126, NIC 128, hard drive 130 and other emulated I/O devices in VM $120_1$). For example, virtual hardware platform $122_1$ may function as an equivalent of a standard x86 hardware architecture such that any x86 supported operating system, e.g., Microsoft Windows®, Linux®, Solaris® x86, NetWare, FreeBSD, etc., may be installed as guest operating system 132 in order to execute applications 136 for an instantiated virtual machine, e.g., VM $120_1$. Virtual hardware platforms $122_1$-$122_N$ may be considered to be part of virtual machine monitors (VMM) $138_A$-$138_N$ which implement the virtual system support needed to coordinate operations between hypervisor 112 and corresponding VMs $120_1$-$120_N$. Those with ordinary skill in the art will recognize that the various terms, layers and categorizations used to describe the virtualization components in FIG. 1 may be referred to differently without departing from their functionality or the spirit or scope of the invention. For example, virtual hardware platforms $122_1$-$122_N$ may also be considered to be separate from VMMs $138_A$-$138_N$, and VMMs $138_A$-$138_N$ may be considered to be separate from hypervisor 112. One example of hypervisor 112 that may be used in an embodiment of the invention is VMkernel™ which is implemented in VMware ESX™ product, which is commercially available from VMware, Inc. of Palo Alto, Calif.

Figure 2:
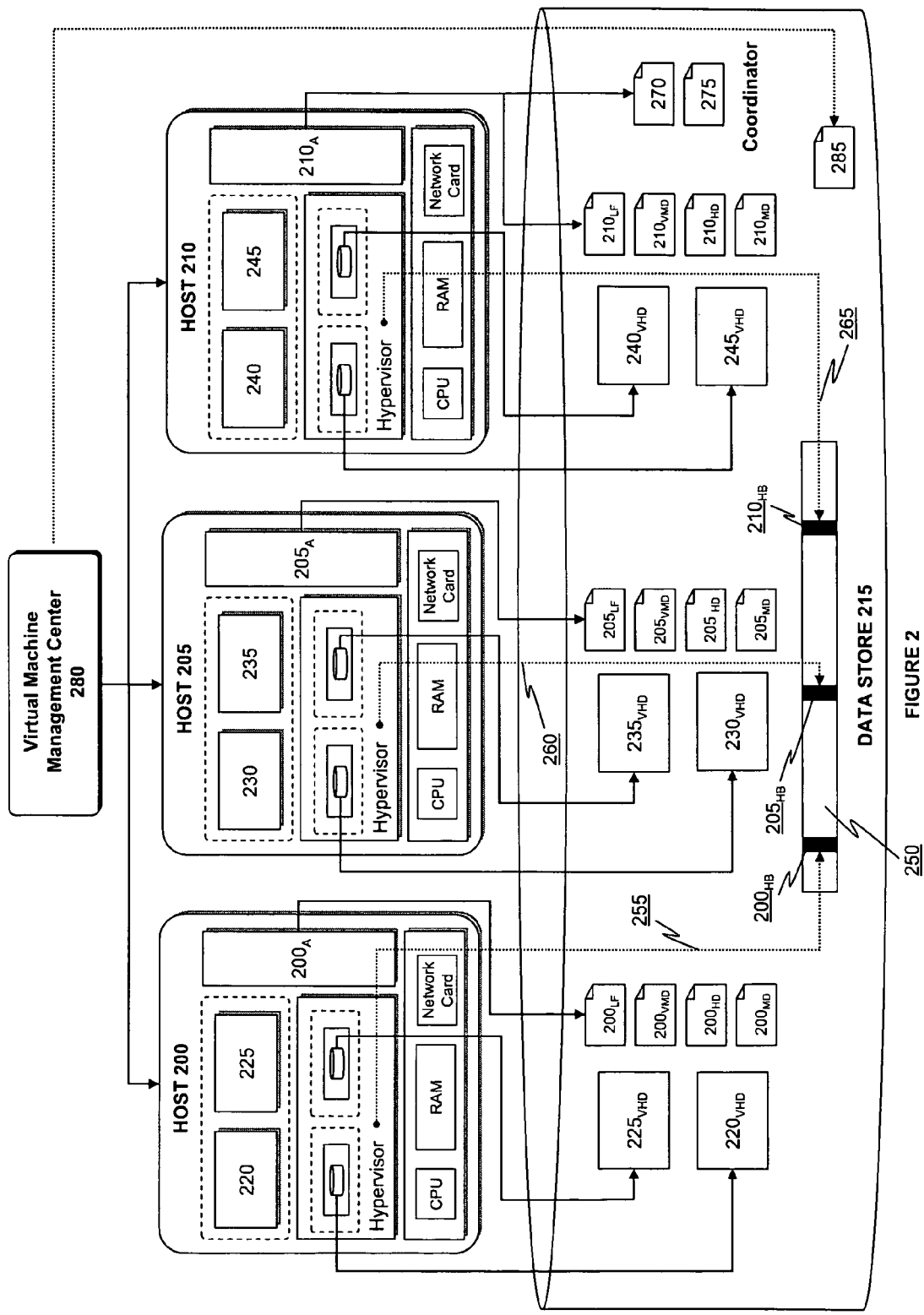
FIG. 2 depicts an exemplary virtual machine cluster architecture in which one or more embodiments of the present invention may be implemented

FIG. 2 depicts an exemplary virtual machine cluster architecture in which one or more embodiments of the invention may be implemented. In the cluster of FIG. 2, each of hosts 200, 205 and 210 is networked to shared data store 215. Host 200 supports virtual machines 220 and 225. Host 205 supports virtual machines 230 and 235. Host 210 supports virtual machines 240 and 245. For each virtual machine in the cluster, shared data store 215 stores its virtual hard disk (e.g., $220_{VHD}$, $225_{VHD}$, ..., $245_{VHD}$) and a virtual machine configuration file detailing, for example, operating system, disk and networking characteristics of the virtual machine (not shown). Shared data store 215 also contains heartbeat region 250 that maintains information about the "liveness" of each host in the cluster. One example of a heartbeat region that is used to manage the renewal of exclusive locks by a host accessing resources on a shared data store is described in U.S. application Ser. No. 11/676,109 entitled "System and Method for Implementing Distributed Locks Via On-Disk Heartbeating," filed Feb. 16, 2007, which is hereby incorporated by reference (hereinafter, the "'109 Application"). The hypervisor of each of hosts 200, 205 and 210 maintains an entry (e.g., $200_{HB}$, $205_{HB}$, $210_{HB}$, respectively) in heartbeat region 250. If a process running on a host acquires exclusive access to a resource on shared data store 215, for example, acquiring exclusive access to a file to write to the file, the hypervisor of such host periodically updates its heartbeat entry during the period in which the process is accessing the file to indicate the host's liveness over time. By inspecting the heartbeat entry of such host, other hosts desiring to access the same file can confirm that the host that currently has exclusive access to the resource is still "alive" and has not failed. If another host discovers that the host's heartbeat entry has not been timely updated, then such other host may conclude that the host has failed and may attempt to acquire exclusive access to the resource itself. One example of a virtual machine cluster file system that implements such heartbeat regions in its data stores to keep track of host liveness is VMware's VMFS (Virtual Machine File System).

Each of hosts 200, 205 and 210 also runs a software "host agent" (e.g., $200_A$, $205_A$, $210_A$, respectively) that manages the host's activities relating to providing high availability. In one embodiment, such host agents run as processes in user space relative to the hypervisor and interact with the kernel of the hypervisor (e.g., via file system application programming interfaces) to access shared data store 215. Each such host agent creates and maintains the following files in its own directory in shared data store 215 for its respective host: (1) a "monitoring" file (e.g., $200_{LF}$), (2) a virtual machine data file (e.g., $200_{VMD}$), (3) a host data file (e.g., $200_{HD}$), and (4) a mailbox directory (e.g., $200_{MD}$). The directory structure and naming conventions of these files are well-known such that other host agents of other hosts can find and access these files in shared data store 215 if desired. For example, a host agent serving as a "coordinator" for shared data store 215, as further described below, may have such a desire to access the foregoing directory and files.

The monitoring file (e.g., $200_{LF}$) is an empty file created by a host agent to provide a mechanism to indicate its host's liveness to other host agents. In the particular embodiment of FIG. 2, a host agent maintains exclusive and continual access to its monitoring file by requesting that its host's hypervisor accesses and acquires the "exclusive lock" of the monitoring file. Once the hypervisor has acquired the exclusive lock, the host agent has exclusive access to the monitoring file and the host's hypervisor will automatically periodically update its heartbeat entry in heartbeat region 250 to indicate its liveness. The exclusive lock of the monitoring file is, itself, a data structure that is stored in shared data store 215 and is locatable by any process desiring to access the monitoring file. The exclusive lock contains a liveness field that is edited by a host's hypervisor that has successfully acquired the lock to point to the host's heartbeat entry in heartbeat region 250. As such, any process desiring to access the monitoring file can locate the exclusive lock and extract the location of the host's heartbeat entry to check the liveness of the host. Further details of one embodiment of the interaction between exclusive locks and a heartbeat region is described in the '109 Application. It should be recognized that various other techniques to implement exclusive locks for files on a shared data store may be utilized, including, for example, having a heartbeat entry or timestamp entry within the exclusive lock itself.

The virtual machine data file (e.g., $200_{VMD}$) comprises a list of virtual machines (e.g., location of the virtual hard drive and virtual machine configuration file, etc. stored on data store 215) running on the host, as well as each such virtual machine's characteristics, such as its CPU, memory reservation and current memory overhead. The host data file (e.g., $200_{HD}$) contains characteristics about the host, itself, such as the host's DNS name, MAC and IP addresses and other host resource information, total CPU and memory, and unreserved CPU and memory. The mailbox directory (e.g., $200_{MD}$) is a messaging mechanism whereby other hosts can submit message files to the host by adding the message files to the mailbox directory.

In addition to managing the foregoing files in its own directory, one of the host agents also serves as a "coordinator" for data store 215 to monitor the liveness of hosts that are running virtual machines whose virtual hard disks (e.g., $220_{VHD}$, etc.) are stored on data store 215. To do this, the coordinator maintains a coordinator's directory that includes: (1) coordinator lock file 270, and (2) coordinator mailbox directory 275. The directory structure and naming conventions of these files are also well-known such that host agents of other hosts can find and access these files in shared data store 215 if desired (as further described below). In the example of FIG. 2, host agent $210_A$ serves as the coordinator for data store 215.

Similar to the monitoring file of a host agent's own directory, host agent $210_A$, as the coordinator, maintains exclusive and continual access to coordinator lock file 270 by requesting that its host's hypervisor accesses and acquires the exclusive lock for coordinator lock file 270. Upon successfully acquiring the exclusive lock, the host's hypervisor inserts its heartbeat entry location into the liveness field of the exclusive lock. Because host agent $210_A$ has exclusive access to coordinator lock file 270, the host's hypervisor automatically periodically updates its heartbeat entry in heartbeat region 250 to indicate its liveness. As further discussed in the context of FIG. 3A, the host agents of each host networked to data store 215 continually monitor the status of coordinator lock file 270 by locating the exclusive lock of the coordinator lock file 270, extracting the location of the heartbeat entry in the liveness field of the exclusive lock, and checking whether the heartbeat entry has been timely updated by the hypervisor of the host of host agent $210_A$. If the hypervisor of the host of the current coordinator has not timely updated its heartbeat entry in the heartbeat region (i.e., indicating a possible failure of the current coordinator), a host agent that is currently checking the liveness field will recognize this, and steal the lock (e.g., by instructing its hypervisor to acquire the lock by embedding its heartbeat entry in the liveness field) to become the new coordinator. Coordinator mailbox directory 275 is similar to host agent $210_A$'s own mailbox directory (i.e., $210_{MD}$), and it provides a file based messaging mechanism for other host agents to communicate with the coordinator (i.e., whichever host agent may be serving as such at any particular time). The coordinator has the responsibility of detecting failures in the cluster and initiating failover recovery, including in accordance with any priorities set forth in cluster files 285 (as further discussed below). As such, the coordinator obviates a need for each host in a cluster to continually monitor the liveness of every other host in the cluster for failover purposes.

Virtual machine management center 280 is utilized by an IT function of an enterprise to create physical clusters and provision virtual machines for the computer systems in the cluster. Virtual machine management center 280 may be run on a separate computer system networked to the other computer systems in a cluster, as in FIG. 2, or it may be run inside a virtual machine on any particular computer system. One example of a virtual machine management center is VMware's VirtualCenter. Such virtual machine management centers create a cluster directory in a data store for each cluster that utilizes the data store such that each data store used by a cluster has a cluster directory for that particular cluster. As shown in FIG. 2, virtual machine management center 280 has created a cluster directory containing cluster files 285, such as a configuration file and virtual-machine-to-host compatibility file, that are accessible by each agent on a host belonging to the cluster. The configuration file details a restart order and priorities for virtual machines running in the cluster, as well as any specific hosts that are designated as failover hosts for other hosts. The virtual-machine-to-host compatibility file details compatibility information between virtual machines and hosts in the event certain virtual machines cannot be supported by the hardware and software configurations of certain hosts in the cluster. It should be recognized that any number of files may be used to store any number of cluster-wide settings and that the foregoing compatibility file and virtual machine-to-host file are merely exemplary. These cluster files, combined with the various files stored for each host agent (monitoring file, virtual machine data file, host data file, and mailbox) and the coordinator for the data store (coordinator lock file and mailbox), provide each data store with metadata needed to failover virtual machines located on such data store.

Figure 3A:
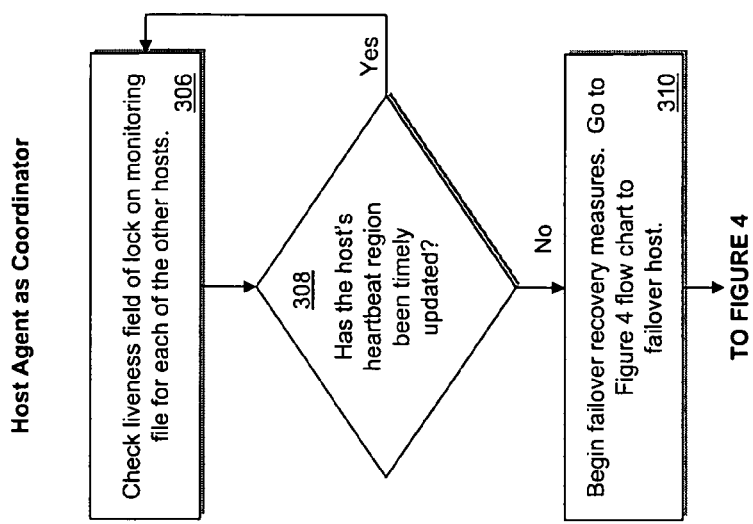
FIG. 3A is a flow chart depicting activities of host agents, including a coordinator host agent, while monitoring for host failures in accordance with one or more embodiments of the present invention.
Figure 3A:
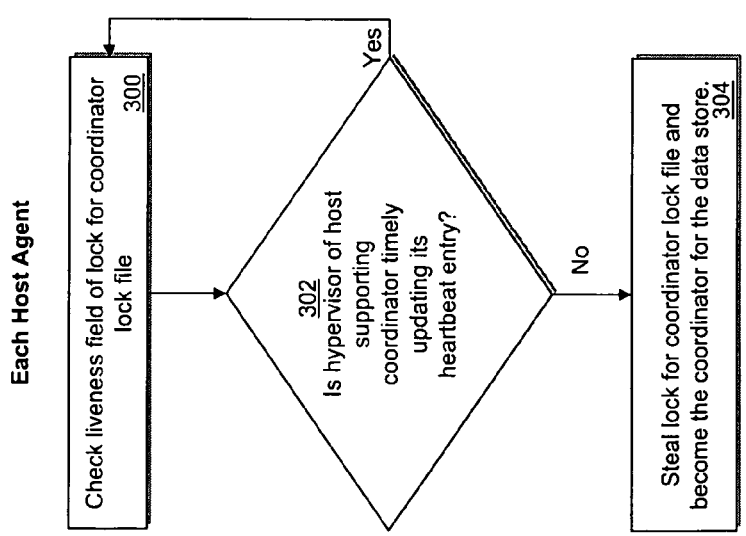

FIG. 3A is a flow chart depicting the activities of host agents, including a host agent that serves as coordinator, while monitoring for host failures. In step 300, each of the host agents, through its corresponding hypervisor, checks the liveness field of the exclusive lock for the coordinator lock file 270, which liveness field points to the heartbeat entry of the hypervisor of the coordinator's host, to confirm that the host of the host agent serving as coordinator is alive. If the host of the host agent serving as coordinator is alive, the hypervisor of the host will be holding the exclusive lock for coordinator lock file, and therefore timely updating its heartbeat entry in heartbeat region 250. In step 302, if the heartbeat entry of the hypervisor of the coordinator's host is being timely updated, the host agent returns to step 300. If the hypervisor of the coordinator's host has not been timely updating its heartbeat entry, the host agent will conclude that the coordinator's host has failed and "steal" the exclusive lock associated with the coordinator lock file (e.g., instruct its hypervisor to embed its heartbeat entry location into the liveness field of the exclusive lock) in step 304, thereby becoming the new coordinator for the data store. Once it becomes the new coordinator, the host agent will take over performance of the coordinator duties as further described below. It should be recognized any host agent may steal the exclusive lock and become the sole coordinator for the data store depending on which host agent first recognizes that the hypervisor of the coordinator's host has not been timely updating its heartbeat entry, and therefore, no coordination among the host agents is needed to elect a new coordinator for the data store.

Simultaneous with the activities of each host agent above, in step 306, the host agent currently serving as the coordinator, through its corresponding hypervisor, checks the liveness field of the locks associated with each of the other host agents' monitoring files, each which points to the heartbeat entry of the hypervisor of each such host agent's host, to confirm that such host agents are alive. If the coordinator discovers in step 308 that any particular host's heartbeat entry has not been timely updated, the coordinator concludes in step 310 that the host has failed and begins to take failover recovery measures to re-instantiate the virtual machines that were running on the failed host.

Figure 3B:
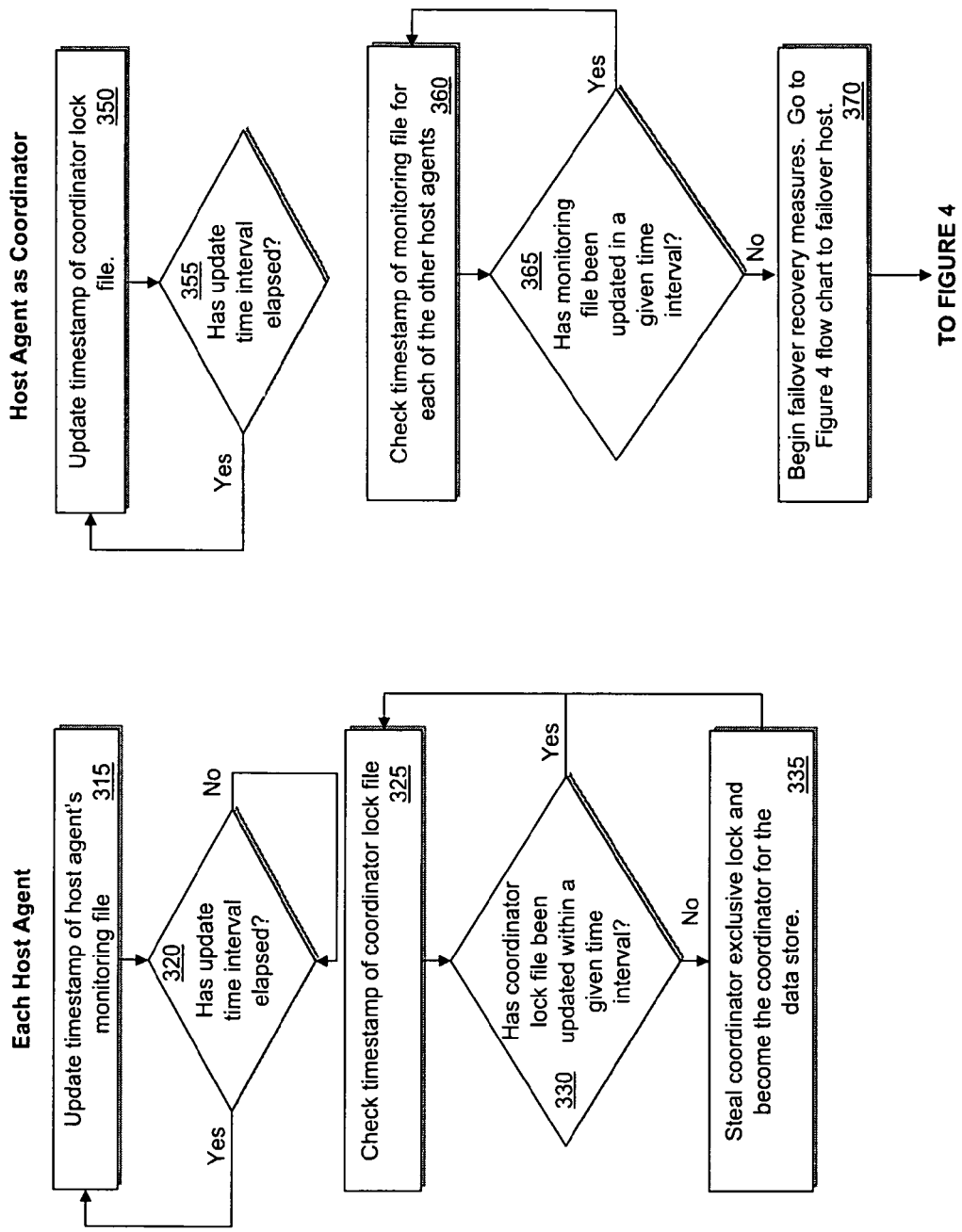
FIG. 3B is a flow chart depicting activities of host agents, including a coordinator host agent, while monitoring for host failures using file timestamps in accordance with one or more embodiments of the present invention.

FIG. 3B is a flow chart for an alternative embodiment in which the coordinator and host agents timestamp the coordinator lock file and monitoring files respectively. Such timestamping may be utilized in addition, or as an alternative, to examining heartbeat entries. In step 315, each of the host agents, through its corresponding hypervisor, updates the timestamp of its own monitoring file to indicate liveness to other host agents (namely, the coordinator). In step 320, if a pre-determined (but configurable) time interval has elapsed (e.g., 5 seconds), the host agent returns to step 315 to update its monitoring file again. Similar to FIG. 3A, each of the host agents also monitors the coordinator's liveness. In step 325, each host agent, through its corresponding hypervisor, also monitors the coordinator lock file to ensure that it is timely updated. In step 330, if any particular host agent discovers that the timestamp of the coordinator lock file has not been updated within a pre-determined (but configurable) time interval, the host agent will "steal" the exclusive lock associated with the coordinator lock file and take over the responsibilities of the coordinator for the data store in step 335.

In step 350, the host agent currently serving as the coordinator for the data store, through its corresponding hypervisor, also updates the timestamp of the coordinator lock file to indicate liveness to the other host agents. In step 355, if the pre-determined time interval has elapsed, the coordinator will return to step 350 to update the coordinator lock file again. In step 360, the coordinator monitors all timestamps of the monitoring files of all the other host agents. If the coordinator discovers in step 365 that any particular host agent's monitoring file has not been timely updated within a predetermined interval, the coordinator concludes in step 370 that the host of such host agent has failed and begins to take failover recovery measures to re-instantiate the virtual machines that were running on the failed host.

Figure 4:
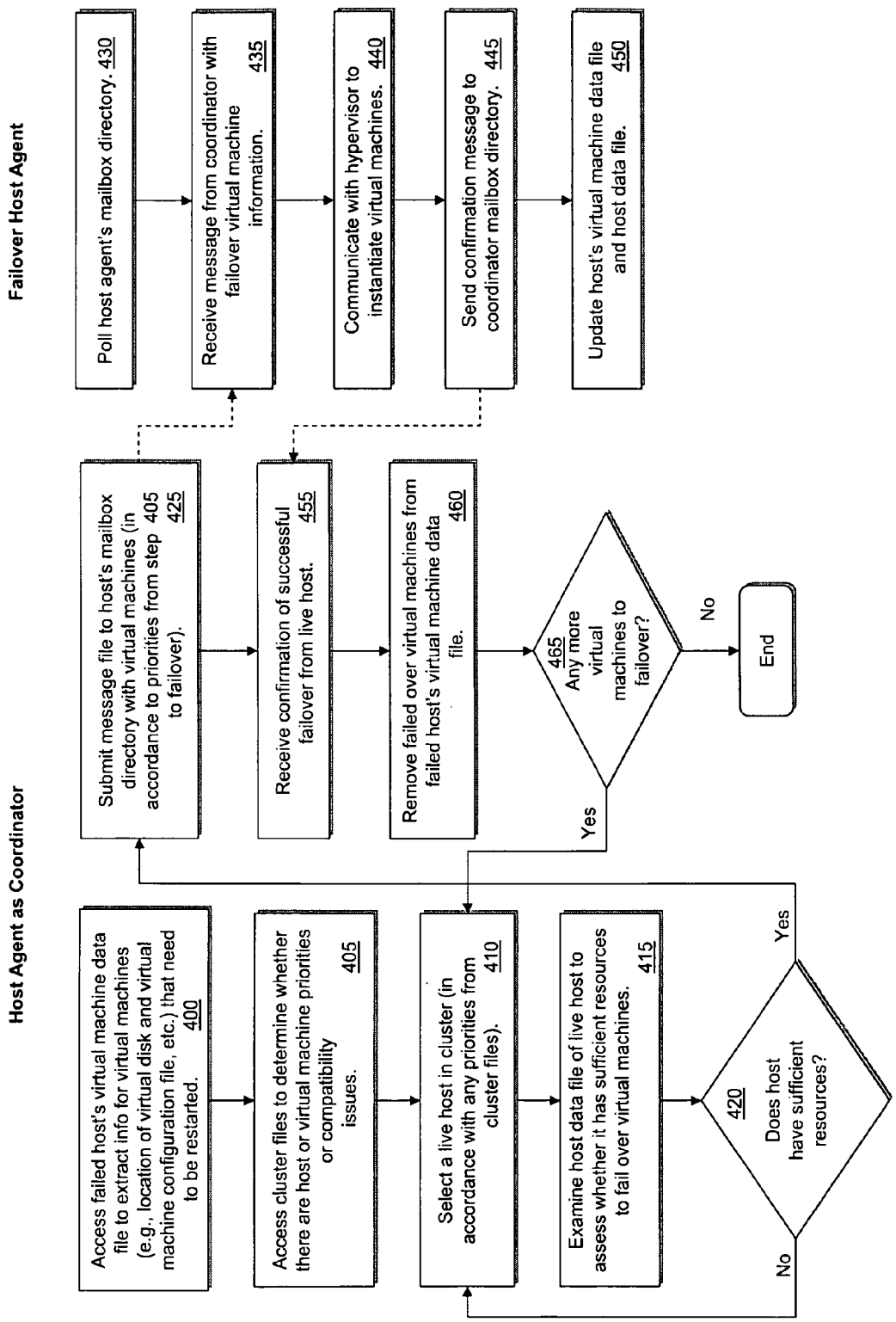
FIG. 4 is a flow chart depicting a process by which a coordinator agent recovers virtual machines of a failed host in accordance with one or more embodiments of the present invention.

FIG. 4 is a flow chart depicting a process by which a coordinator for a data store recovers virtual machines of a failed host whose virtual hard disks are stored on the data store. In step 400, the coordinator accesses the failed host's virtual machine data file to determine which virtual machines (e.g., the location of the virtual hard disk and virtual machine configuration file on the data store, etc.) need to be restarted and their associated resource requirements. The coordinator then, in step 405, accesses cluster files 285 to determine whether any virtual machines and hosts have failover priority or compatibility issues. In step 410, the coordinator selects an available host in the cluster (e.g., in accordance with any host failover priorities specified in cluster files 285) and accesses its host data file in step 415 to assess whether the host has available resources to restart a virtual machine. If the host has sufficient resources to restart a virtual machine in step 420, then, in step 425, the coordinator places a message file in the mailbox directory of the host agent of the host specifying the virtual machines to failover in accordance with any priorities compatibility requirements obtained from the cluster files in step 405.

Simultaneous with the foregoing activities of the coordinator, in step 430, the host agent continuously polls its mailbox directory for new messages. When it receives the coordinator's message from step 425, the host agent reads the message in step 435 and begins the process of interacting with the host's hypervisor to perform recovery of the specified virtual machines in step 440. Once the virtual machines are successfully instantiated on the host, in step 445, the host agent transmits a message to the coordinator's mailbox directory confirming the successful recovery of the virtual machines. In step 450, the host agent then updates its own virtual machine data file and host data file to incorporate information regarding the newly instantiated virtual machines and the resources utilized by them.

Once the coordinator receives the confirmation message in step 455, the coordinator removes those virtual machines from the failed host's virtual machine data file in step 460. In step 465, if there are any more remaining virtual machines in the failed host's virtual machine data file, the coordinator returns to step 410 to find another host with available resources to fail over the remaining virtual machines.

Since it is possible for the hosts of a cluster to make use of different data stores, the different coordinators of each data store used by the cluster can communicate among each other to coordinate failover virtual machine priority across the different data stores. FIG. 5 depicts an example cluster configuration using different data stores. Each of hosts 500, 505 and 510 have access to both of shared data stores 515 and 520. Host agent $500_A$ serves as the coordinator of data store 515 and host agent $510_A$ serves as the coordinator of data store 520. Host 505 runs four instantiated virtual machines, two of them, 525 and 530, use data store 515 and the other two, 535 and 540, use data store 520. Because the cluster configuration utilizes both shared data stores 515 and 520, as shown in FIG. 5, virtual machine management center 550 stores cluster files 545 in a cluster directory in both data stores. Cluster files 545 indicate that virtual machines 525 and 535 are high priority virtual machines while virtual machines 530 and 540 are low priority machines. This means that in the event that host 505 suffers a failure, virtual machine 525 on data store 515 and virtual machine 530 on data store 520 should be failed over before virtual machines 535 and 540. However, as the coordinator for data store 515, host agent $500_A$ will only recognize that virtual machines 525 and 530 have failed and will begin to failover these two virtual machines. Similarly, host agent $510_A$ as coordinator for data store 520 only recognizes that virtual machines 535 and 540 have failed and will begin to failover these two virtual machines. If, for example, host 500 and host 510 each have only enough resources to each failover one virtual machine, in the event of a failure of host 505, host agent $500_A$, as coordinator for data store 515, may first failover high priority virtual machine 525 on itself and then instruct host agent $510_A$ to failover low priority virtual machine 530. Similarly, host agent $510_A$, as coordinator for data store 520, may first failover high priority virtual machine 535 and then instruct host agent $500_A$ to failover low priority virtual machine 540. Without coordination between the two coordinators, it is possible that low priority virtual machines may be failed over before high priority machines. For example, if host agent $500_A$, as coordinator for data store 515, successfully fails over virtual machine 525 before host agent $510_A$, as coordinate for data store 520, even recognizes that host 505 has failed, host agent $500_A$ will instruct host agent $510_A$ to failover low priority virtual machine 530 on data store 515 before host agent $510_A$, as coordinator for data store 520, even recognizes that high priority virtual machine 535 (as well as low priority virtual machine 540) has failed and needs to be restored.

In one embodiment, a "master" coordinator is selected among the various coordinators to ensure that virtual machine failover priorities are respected. For example, in the embodiment of FIG. 5, host agent $510_A$ may be elected to be the master coordinator (e.g., automatically and arbitrarily or manually, by user configuration). Other coordinators consult the master coordinator to make placement decisions for failover to ensure that high priority virtual machines are restored before low priority virtual machines. For example, host agent $500_A$ will consult host agent $510_A$ (e.g., by sending host agent $510_A$ a list of the virtual machines it needs to fail over) prior to restoring virtual machines 525 (on host 500 on data store 515) and 530 (on host 510 on data store 515). Host agent $510_A$, as the master coordinator, may inform host agent $500_A$ that it should only restore virtual machine 525 on data store 515 and allow low priority virtual machine 530 to lapse, thereby allowing host agent $510_A$ (as coordinator for data store 520) to restore high priority virtual machine 535 on data store 520, given the priorities.

Persons skilled in the art will understand that various modifications and changes may be made to the specific embodiments described herein without departing from the broader spirit and scope of the invention as set forth in the appended claims. The foregoing description and drawings are, accordingly, to be regarded in an illustrative rather than a restrictive sense. For example, while the foregoing description has described host agents as separate from hypervisors, it should be recognized that this is a functional distinction and that alternative embodiments may have the functionality of such host agents embedded into hypervisors. Furthermore, in alternative embodiments, network based heartbeating may be utilized as a primary liveness check, whereby the coordinator transmits heartbeat signals through the network to the other host agents to indicate its liveness and each of the other host agents transmit heartbeat signals to the coordinator to indicate their respective liveness. In such alternative embodiments, storage-based heartbeating, such as those utilized in FIGS. 3A and 3B may be utilized as a secondary liveness check. Similarly, host-to-host communication utilizing the network may be used in alternative embodiments as a primary communication medium, with the file-based mailbox communication mechanisms described in FIG. 4 as a backup mechanism. Alternative embodiments may also not have coordinator mailbox directory 275 as in FIG. 2. Instead, during step 445 of FIG. 4, a failover host agent submits a confirmation message to the mailbox of the host that serves as coordinator (i.e., rather than a special coordinator mailbox). As discussed, while embodiments utilizing VMFS data stores may have a heartbeat region in each data store, embodiments utilizing NFS data stores do not have a heartbeat region. In such embodiments, the hypervisor may create a special lock file associated with an opened file (e.g., coordinator lock file or monitoring file, etc.) which includes a logical timestamp that is periodically updated by the hypervisor (in a similar manner as the heartbeat region). It should be further recognized that the techniques disclosed herein can be applied to environments where some subset of the hosts in the cluster have access to some data stores while other hosts have access to different data stores. In such embodiments, virtual machines can be failed over to other hosts in their "storage island." It should also be recognized that the techniques disclosed herein can be further applied to environments where virtual machines are not running on a shared data store. For example, mechanisms such as data store mirroring can keep a copy of the virtual machine files in sync on a different data store.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. In a computer system having virtual machines instantiated on a cluster of host computers networked to a shared storage system, a method of monitoring failures in the host computers, comprising:
   for each host computer that is not currently serving as a coordinator in the cluster on which at least one of the virtual machines is instantiated, periodically examining a liveness indicator stored in the shared storage system corresponding to said host computer by one of said host computers in the cluster that is currently serving as the coordinator, wherein the liveness indicator stored in the shared storage system is updated by a hypervisor of said host computer if said host computer has not failed, the hypervisor of said host computer being configured to support initiation and execution of at least one of the virtual machines on said host computer; and
   identifying at least one of the host computers that is not currently serving as the coordinator whose liveness indicator stored in the shared storage system has not been updated within a predetermined time interval as a failed host computer by the coordinator.

2. The method of claim 1, wherein the liveness indicator is a heartbeat entry of the corresponding host computer, wherein said examining step comprises inspecting a lock associated with a file stored in the shared storage system associated with the liveness indicator, wherein said lock comprises a reference to said heartbeat entry, and wherein the corresponding host computer maintains possession of said lock.

3. The method of claim 1, wherein each host computer that is not the coordinator carries out the steps of:
   periodically examining a liveness indicator associated with a coordinator file in the shared storage system to assess a liveness of the coordinator; and
   assuming responsibilities of the coordinator if said liveness indicator associated with the coordinator file has not been updated within a predetermined time period.

4. The method of claim 3, wherein the liveness indicator associated with the coordinator file is a heartbeat entry of the host computer serving as the coordinator, said examining step comprises inspecting a lock associated with said coordinator file, wherein said lock comprises a reference to the heartbeat entry, the host computer serving as coordinator maintains possession of said lock, and said assuming step comprises acquiring possession of said lock by the host computer performing the examining step.

5. The method of claim 1, wherein each host computer maintains (i) a data file in the shared storage system, wherein the data file comprises data characteristics relating to each virtual machine instantiated on said host computer, and (ii) a second data file in the shared storage system, wherein the second data file comprises data characteristics relating to the computing resources of said host computer.

6. The method of claim 5, wherein each host computer further maintains a mailbox directory in the shared storage system, wherein message files are sent to the mailbox directory by a host computer serving as the coordinator to instruct said host computer to instantiate failed virtual machines.

7. A computer system adapted to monitor failures of host computers supporting virtual machines, the computer system comprising:
    a data store;
    a cluster of host computers networked to the data store, the host computers including hypervisors that are configured to update liveness indicators stored in the data store, each of the hypervisors being further configured to support initiation and execution of at least one of the virtual machines on one of the host computers; and
    a coordinator host computer networked to the data store and comprising a processor programmed to (i) for each host computer in the cluster on which at least one of the virtual machines is supported, periodically examine a liveness indicator stored in the data store corresponding to said host computer, and (ii) identify at least one of the host computers whose liveness indicator stored in the data store has not been updated within a predetermined time period as a failed host computer, wherein the coordinator host computer is one of the host computers of the cluster.

8. The computer system of claim 7, wherein the data store further stores, for each host computer: (i) a data file comprising data characteristics relating to each virtual machine instantiated on said host computer, and (ii) a second data file comprising data characteristics relating to computer resources of said host computer.

9. The computer system of claim 7, wherein the processor of the coordinator host computer is further programmed to hold a lock on a coordinator file to maintain a liveness status for the coordinator host computer.

10. The computer system of claim 9, wherein a processor of each host computer in the cluster is programmed to: (i) periodically examine said lock of said coordinator file for updates to a liveness indicator corresponding to said lock, (ii) and acquire the lock in the event the liveness indicator has not been updated within a predetermined time period, whereby said host computer assumes coordinator responsibilities as a new coordinator host computer.

11. The computer system of claim 7, further comprising: a virtual management center networked to the cluster of host computers and the data store, wherein the virtual management center maintains a failover priority for virtual machines running on the cluster of host computers.

12. The computer system of claim 11, wherein the data store further comprises at least one data file comprising data relating to the failover priority for virtual machines running on the cluster of host computers.

13. A non-transitory computer readable storage medium having stored therein a computer program for monitoring failures in a cluster of host computers networked to a shared storage system supporting virtual machines, wherein a computer serving as a coordinator executing the computer program carries out the steps of:
    for each host computer that is not currently serving as the coordinator in the cluster on which at least one of the virtual machines is instantiated, periodically examining a liveness indicator stored in the shared storage system corresponding to said host computer, wherein the liveness indicator stored in the shared storage system is updated by a hypervisor of said host computer if said host computer has not failed, the hypervisor of said host computer being configured to support initiation and execution of at least one of the virtual machines on said host computer; and
    identifying at least one of the host computers that is not currently serving as the coordinator whose liveness indicator stored in the shared storage system has not been updated within a predetermined time interval as a failed host computer.

14. The non-transitory computer readable storage medium of claim 13, wherein the liveness indicator is a heartbeat entry of the corresponding host computer, wherein said examining step comprises inspecting a lock associated with a file stored in the shared storage system associated with the liveness indicator, wherein said lock comprises a reference to said heartbeat entry, and wherein the corresponding host computer maintains possession of said lock.

15. The non-transitory computer readable storage medium of claim 13, wherein one of the host computers in the cluster executing the computer program carries out the steps of:
    periodically examining a liveness indicator associated with a coordinator file in the shared storage system to assess a liveness of the coordinator; and
    assuming responsibilities of the coordinator if said liveness indicator associated with the coordinator file has not been updated within a predetermined time period.

16. The non-transitory computer readable storage medium of claim 15, wherein the liveness indicator associated with the coordinator file is a heartbeat entry of the host computer serving as the coordinator, said examining step comprises inspecting a lock associated with said coordinator file, wherein said lock comprises a reference to the heartbeat entry, the host computer serving as coordinator maintains possession of said lock, and said assuming step comprises acquiring possession of said lock by the host computer performing the examining step.

17. The non-transitory computer readable storage medium of claim 15, wherein the host computer in the cluster executing the computer program further carries out the steps of (i) maintaining a data file for the host computer, wherein the data file comprises data characteristics relating to each virtual machine instantiated on the host computer; and (ii) maintaining a second data file for the host computer, wherein the second data file comprises data characteristics relating to the computing resources of the host computer.

18. The non-transitory computer readable storage medium of claim 17, wherein the host computer executing the computer program further carries out the step of maintaining a mailbox directory for the host computer, wherein message files are sent to the mailbox directory by the coordinator to instruct the host computer to instantiate failed virtual machines.

\* \* \* \* \*